US012711143B2

(12) United States Patent
Allam et al.

(10) Patent No.: US 12,711,143 B2
(45) Date of Patent: Aug. 18, 2026

(54) QUERY GENERATION WITH RANKING RECOMMENDATION

(71) Applicant: Dell Products L.P., Round Rock, TX (US)

(72) Inventors: Mahender Allam, Ghanpur (IN); Furkan Mohd Nisar, Uttar Pradesh (IN); Vivek Bhargava, Bangalore (IN); Dinesh Koppada, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 16 days.

(21) Appl. No.: 18/926,054

(22) Filed: Oct. 24, 2024

(65) Prior Publication Data

US 2026/0119513 A1 Apr. 30, 2026

(51) Int. Cl.
*G06F 16/248* (2019.01)
*G06F 16/2452* (2019.01)
*G06F 16/2455* (2019.01)

(52) U.S. Cl.
CPC ...... *G06F 16/248* (2019.01); *G06F 16/24522* (2019.01); *G06F 16/24553* (2019.01)

(58) Field of Classification Search
CPC ............. G06F 16/248; G06F 16/24522; G06F 16/24553
See application file for complete search history.

(56) References Cited

U.S. PATENT DOCUMENTS 12,443,595 B1 * 10/2025 Sehwag .............. G06F 16/2425

OTHER PUBLICATIONS

Mithani, A Novel Approach for SQL Query Optimization, pp. 1-4 (Year: 2016).*
Wang, Robust Text-to-SQL Generation with Execution-Guided Decoding, pp. 1-8 (Year: 2018).*

* cited by examiner

*Primary Examiner* — Albert M Phillips, III
(74) *Attorney, Agent, or Firm* — Chamberlain, Hrdlicka, White, Williams & Aughtry; Aly Z. Dossa

(57) ABSTRACT

A method for generating ranked queries includes receiving a structured query language (SQL) input, identifying a target database based on the SQL input, identifying an optimization ruleset based on the target database, generating a set of potential queries by using the SQL input and the optimization ruleset as an input to a natural language processor, generating a set of rankings, where each ranking is associated with one of the set of potential queries, causing to display, on a graphical user interface of a query device interface, each query of the set of potential queries based on the set of rankings, receiving a user input from the query device interface, and performing an action from an action set based on the user input.

14 Claims, 4 Drawing Sheets

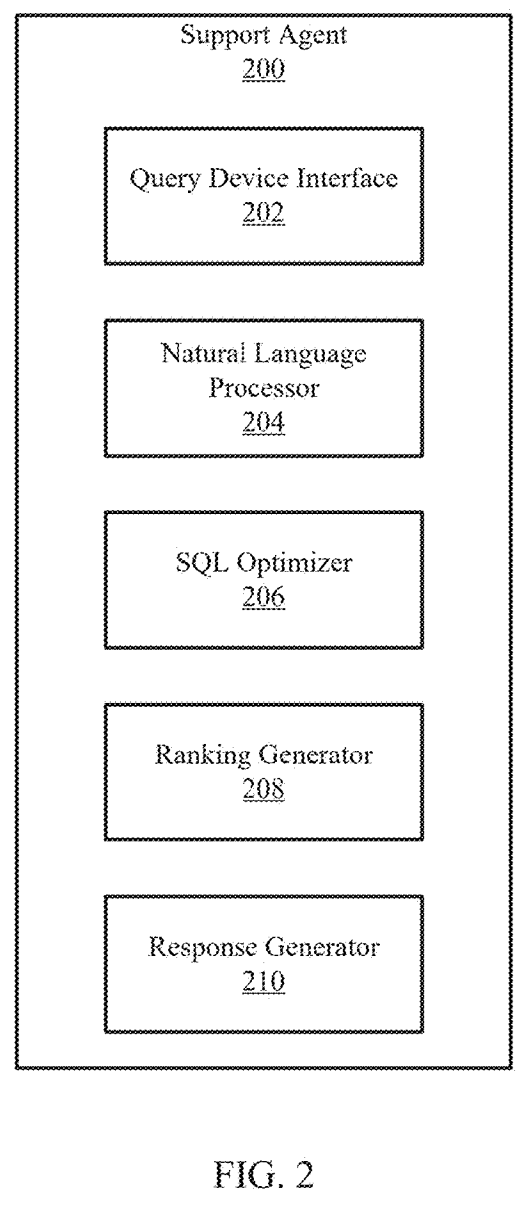

Support Agent 200

Query Device Interface 202

Natural Language Processor 204

SQL Optimizer 206

Ranking Generator 208

Response Generator 210

FIG. 2

QUERY GENERATION WITH RANKING RECOMMENDATION

BACKGROUND

Large amounts of information are often stored in structured formats within databases and users may want to search through these databases to find particular sets of information. However, searching these databases may require structuring searches in a particular format with which many users may be unfamiliar. In addition, training users to utilize these particular formats may be time-consuming.

BRIEF DESCRIPTION OF DRAWINGS

Certain embodiments of the disclosure will be described with reference to the accompanying drawings. However, the accompanying drawings illustrate only certain aspects or implementations of the disclosure by way of example and are not meant to limit the scope of the claims.

FIG. 2 shows a diagram of a support agent in accordance with one or more embodiments.

DETAILED DESCRIPTION

Figure 1:
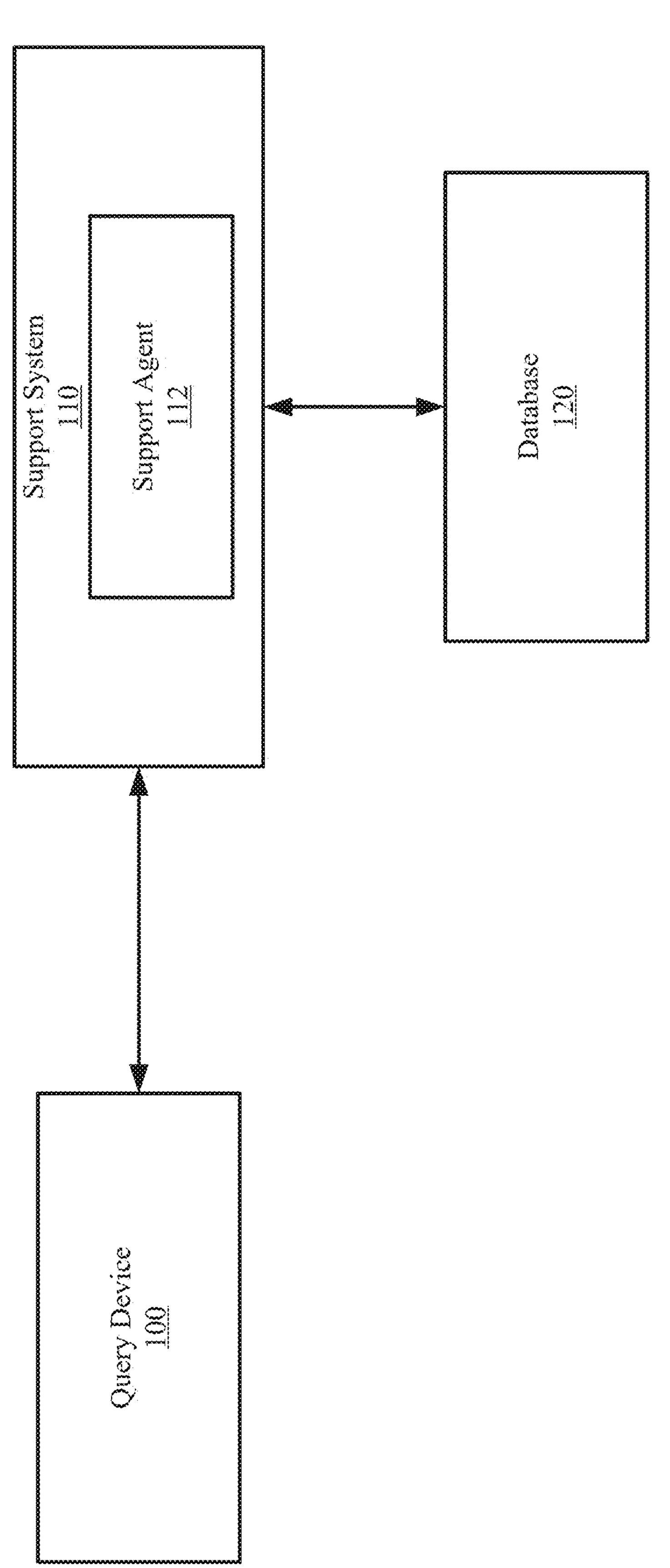
FIG. 1 shows a diagram of a system in accordance with one or more embodiments.

In the below description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

The rapid proliferation of relational databases has underscored the need for efficient searching through the relational databases. Typically searching databases involves the use of querying via structured query language (SQL). However, learning how to query through SQL is a difficult, time consuming task. As such, using natural language searches using a technique called text-to-SQL has emerged as a popular solution to this problem. However, implementing text-to-SQL has presented several challenges, such as poor query performance, limited user guidance, dynamic database environments, query optimization complexity, and data retrieval. Current systems often generate suboptimal SQL queries from natural language queries without optimization strategies, causing slow execution times and increased resource usage, which is magnified for large datasets. Further, users, especially those without technical expertise, struggle with optimizing queries manually due to a lack of guidance and experience and users struggle to learn while using text-to-SQL to improve query efficiency and adhere to best practices. In addition, existing tools struggle to keep up with rapidly changing database technologies and user needs, leading to outdated or less efficient queries over time. Moreover, text-to-SQL queries tend to be more of an iterative process and may take several queries for a user to extract the data they are seeking from databases, which is further magnified when dealing with large datasets and inefficient queries cause delays and resource-intensive operations during the extraction process.

To address, at least in part, the aforementioned issues discussed above, embodiments disclosed herein relate to systems, methods, and/or non-transitory computer readable mediums that provide users, especially users with less SQL knowledge, with an intuitive and easy-to-use interface to interact with databases. In one or more embodiments, the approach combines an extensive dictionary for optimization rules, natural language processing (NLP), and a ranking system to provide a well-rounded optimization approach to text to SQL queries. In one or more embodiments, the approach includes a dynamic ranking system that ranks alternative queries based on a variety of parameters, including execution time, resource consumption, and adherence to optimization standards; incorporates user intent analysis into the NLP procedure for SQL query generation; produces queries that support the user's initial objectives by comprehending and implementing human intent; enables users to define queries in simple terms while taking advantage of optimized SQL queries; and improves accessibility and intuitiveness of database interaction.

In addition, the provided approach provides a number of advantages, such as faster database query execution times; more economical resource use; overall better query performance; more efficient SQL queries for large datasets; reduced execution times and resource usage; reduced costs from a drop in server load; reduced response times; increased consistency for approaches to query optimization; reduced possibility of deploying suboptimal queries; and reduced reliance on database administrators for query optimization tasks, thereby freeing up administrative resources for more strategic database management tasks.

The following describes one or more embodiments.

FIG. 1 shows a system in accordance with one or more embodiments. The system may include a query device (100) a support system (110), and a database (120). Each of these system components is described below.

In one or more embodiments, the query device (100), the support system (110), and/or the database (120) may operatively connect to one another through a network (not shown) (e.g., a local area network (LAN), a wide area network (WAN) such as the Internet, a mobile network, any other network type, or a combination thereof). The network may be implemented using any combination of wired and/or wireless connections. Further, the network may encompass various interconnected, network-enabled subcomponents (or systems) (e.g., switches, routers, gateways, etc.) that may facilitate communications between the query device (100), the support system (110), and the database (120). Moreover, the query device (100), the support system (110), and the database (120) may communicate with one another using any combination of wired and/or wireless communication protocols.

In one or more embodiments, the query device (100) may represent any physical computing system whereby one or more users may pose queries (also referred to herein as user inputs) and, subsequently, may receive resources (or information) best fit to address the queries. To that extent, the query device (100) may include functionality to: capture user inputs from users through speech and/or text; delegate the user inputs to the support system (110) for processing; and receive resources (i.e., information through one or more forms or formats—e.g., text, images, speech, etc.) from the support system (110), which may address the user inputs and provide the received resources to the users. One of ordinary skill will appreciate that the query device (100) may perform other functionalities without departing from the scope of the disclosure. Examples of the query device (100) may include, but are not limited to, a desktop computer, a laptop computer, a tablet computer, a smartphone, a smart speaker, any other computing system similar to the exemplary computing system shown in FIG. 4, a telephone, or any other device capable of facilitating communication between a user and the support system (110).

While FIG. 1 shows a configuration of components, other system configurations may be used without departing from the scope of the disclosure. For example, in one embodiment, more than one query device (not shown) may operatively connect to the support system (110).

In one or more embodiments, the support system (110) includes a support agent (112) that includes functionality to receive user inputs and provide responses to the user inputs via the query device (100). With this functionality, the user may provide to the support system (110) (e.g., via the query device (100)) a natural language query that the support system (110) can translate to a database query, such as a SQL query, provide a ranked set of possible queries along with information about the various performance attributes of each query, perform a search of a database (e.g., database (120)) using the database query, and then provide the results of the query to the user (e.g., via the query device (100)). To do so, the support agent (112) may represent a machine learning processing platform described in greater detail below.

In one or more embodiments, the support system (110) is implemented using one or more computing devices (not shown), which may include computing servers. Each server may represent a physical server that may reside in a datacenter, or a virtual server that may reside in a cloud computing environment. Additionally or alternatively, the support system (110) may be implemented using one or more computing systems similar to the exemplary computing system shown in FIG. 4.

In one or more embodiments, the database (120) is used to store data that is used by the support system (110). In one or more embodiments, the database (120) is the target database that a user wishes to search. In one or more embodiments, the database (120) stores data used by the support agent (112) to perform functionality as described in detail below.

In one or more embodiments, the database (120) is implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The database (120) may be implemented using other types of computing devices without departing from the embodiments disclosed herein. For additional details regarding computing devices, refer to FIG. 4. Further, in one or more embodiments, the database (120) is located on any combination of the query device (100), the support system (110), and any other location.

In one or more embodiments, the query device (100), the support system (110), and/or the database (120) are implemented using logical devices without departing from the embodiments disclosed herein. For example, the query device (100), the support system (110), and/or the database (120) may include virtual machines that utilize computing resources of any number of physical computing devices to provide the functionality of the query device (100), the support system (110), and/or the database (120). The query device (100), the support system (110), and/or the database (120) may be implemented using other types of logical devices without departing from the embodiments disclosed herein.

FIG. 2 shows a support agent (200) (i.e., the support agent (112) in FIG. 1) in accordance with one or more embodiments. The support agent (200) includes a query device interface (202), a natural language processor (204), a SQL optimizer (206), a ranking generator (208), and a response generator (210). Each of these system components is described below.

Figure 3:
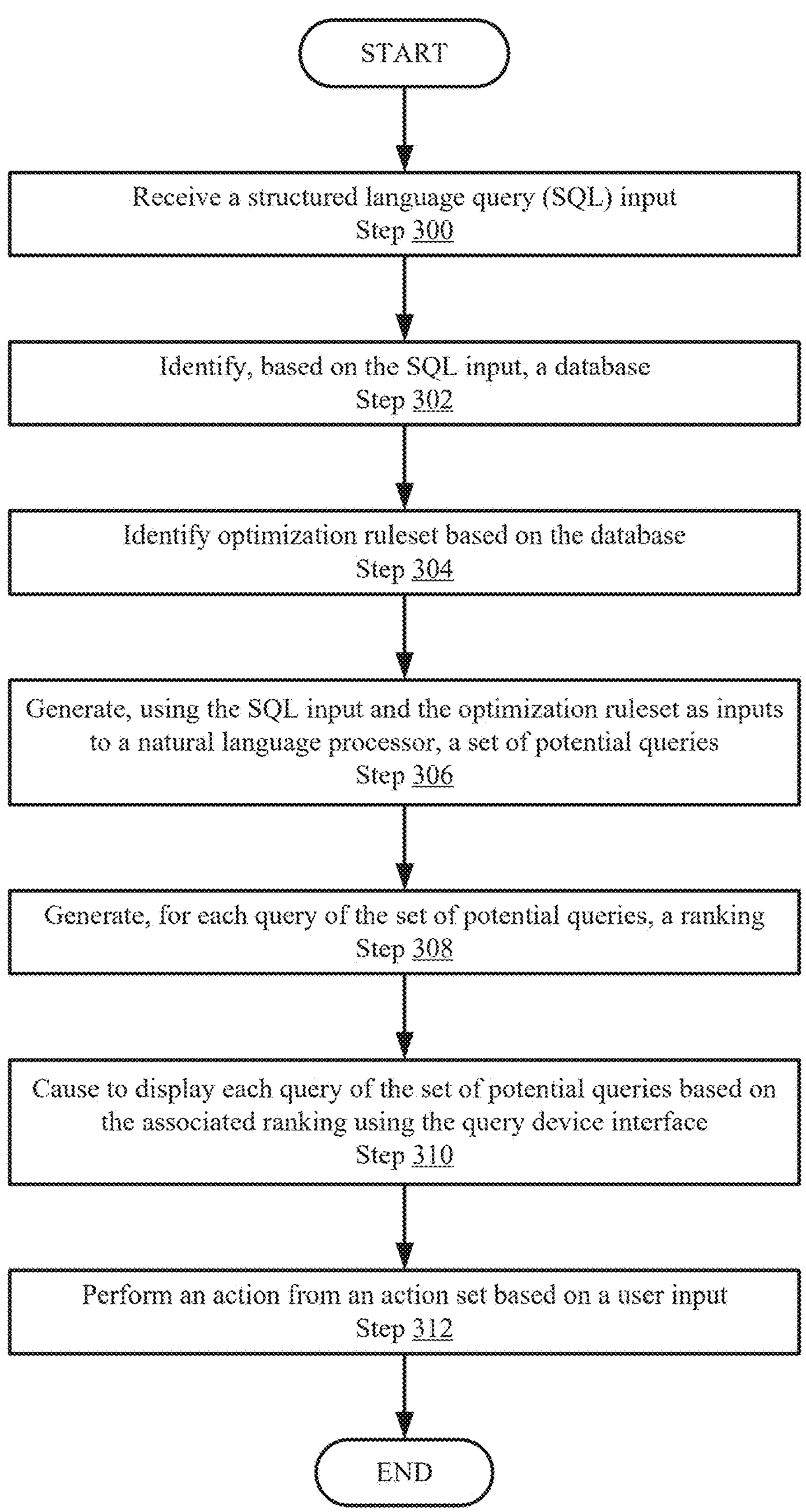
FIG. 3 shows a flowchart of a method for automatically generating and performing an action based on an input in accordance with one or more embodiments.
Figure 4:
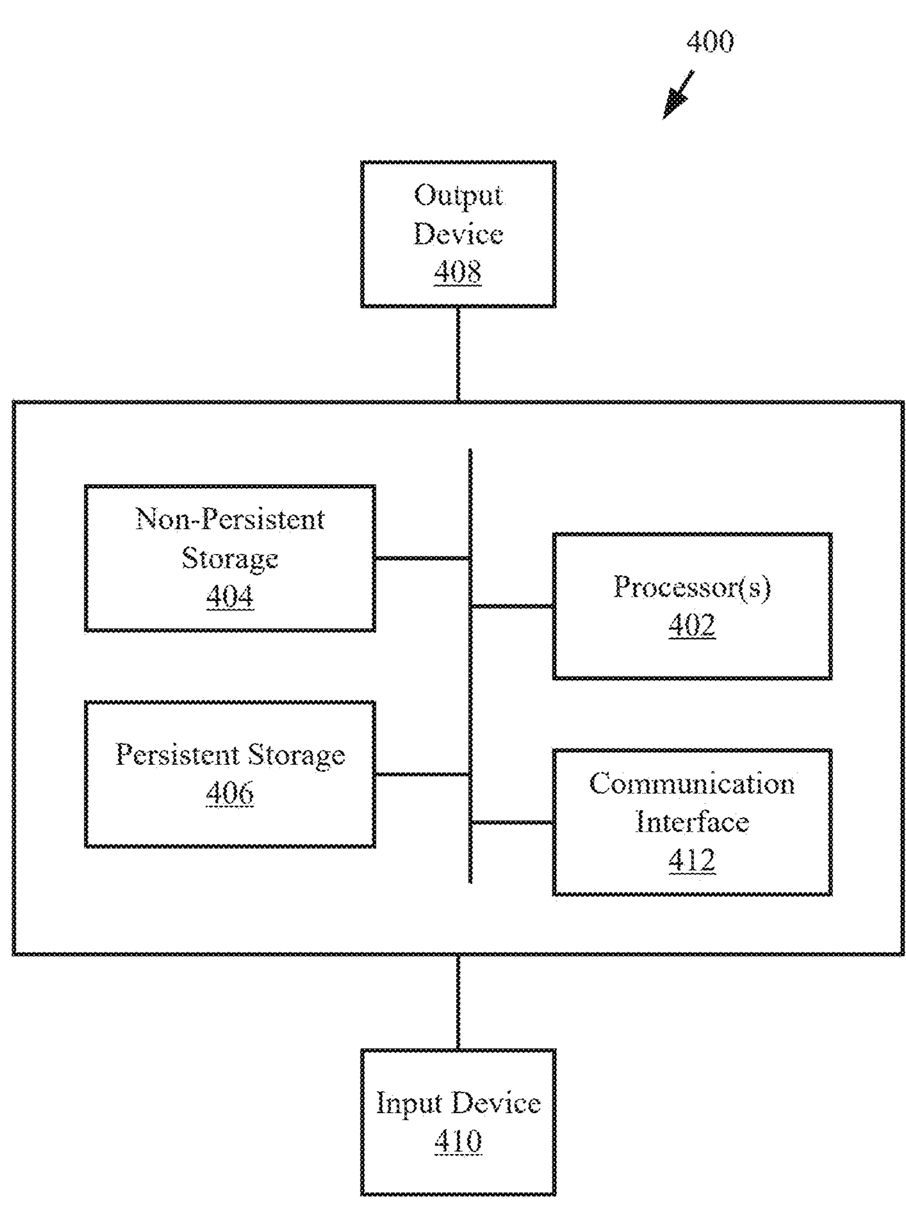
FIG. 4 shows a computing system in accordance with one or more embodiments.

In one or more embodiments, one or more of the query device interface (202), the natural language processor (204), the SQL optimizer (206), the ranking generator (208), and the response generator (210) are implemented as a computing device (see e.g., FIG. 4). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the associated component described throughout this application and/or all, or a portion thereof, of the method illustrated in FIG. 3.

In one or more embodiments, one or more of the query device interface (202), the natural language processor (204), the SQL optimizer (206), the ranking generator (208), and the response generator (210) are implemented as a logical device. The logical device may utilize the computing resources of the support agent (200) and thereby provide the functionality of the associated component described throughout this application and/or all, or a portion thereof, of the method illustrated in FIG. 3.

In one or more embodiments, the query device interface (202) is designed and configured to facilitate communications between the support agent (200) and any query device (not shown) (see e.g., FIG. 1). To that extent, the query device interface (202) may include functionality to: receive user inputs (e.g., audio or textual information) from a query device; perform preliminary processing to convert the user inputs into a machine-readable format; provide the user inputs to the other components of the support agent (200); receive responses, which may or may not address the user inputs, from the response generator (210); provide the responses to the query device; receive feedback (i.e., additional user inputs reflecting whether the responses properly addressed the user inputs) from the query device; and repeat all of the above to form a conversation with a user.

In one or more embodiments, the query device interface (202) is designed and configured to convert user inputs, if received in any spoken language or audio data format, into a textual data format. To that extent, the query device interface (202) may include functionality to: transcribe audio-formatted user inputs into text-formatted user inputs using any existing speech recognition or speech-to-text algorithm; and provide the text-format input queries to the other components of the support agent (200) for processing. If the input queries are already textually formatted when received, then the query device interface (202) may include further functionality to circumvent the data format conversion process and, subsequently, provide the other components of the support agent (200) with the received user inputs. One of ordinary skill will appreciate that the query device interface (202) may perform other functionalities without departing from the scope of the disclosure.

In one or more embodiments, the natural language processor (204) is designed and configured to receive the user inputs from the query device interface (202) and convert the natural language query into embeddings, such as SQL queries. In one or more embodiments, the natural language processor (204) utilizes natural language processing techniques that may be further refined via training using datasets such as databases, natural language to SQL queries, etc. In one or more embodiments, the natural language processor (204) is integrated into the query device interface (202) to enable the SQL optimizer (206) and/or the ranking generator (208) to utilize the embeddings from the natural language query. In one or more embodiments, the natural language processor utilizes outputs from both the SQL optimizer (206) and the query device interface (202) to generate potential SQL queries, as described in further detail below in FIG. 3.

In one or more embodiments, the SQL optimizer (206) is designed and configured to generate and/or retrieve optimization rules related to a SQL query, which may be input directly from a user or may be translated from a natural text input to a SQL query (e.g., by the natural language processor (204)). To that extent, the SQL optimizer (206) may include functionality to: generate and/or retrieve optimization rules, such as an optimization ruleset, which may be input by a user or automatically generated; employ optimization rules based on characteristics of the database being queried (e.g., metadata associated with the database which may include the size of the database, the type stored in the database, compliance rules associated with the database, row and column information, applications and/or users associated with the database, etc.), the types of queries being utilized (e.g., associated with the database and/or the user requesting the queries), and/or desired performance outcomes for the input query (e.g., resource efficiency, time efficiency, or a combination thereof); and automatically update the optimization rules based on past performances of queries.

In one or more embodiments, the optimization ruleset includes index utilization, avoid "SELECT", join optimization, subquery optimization, aggregate functions, avoid cursors, where clause, avoid "ORDER BY" in subqueries, avoid function in "WHERE" clause, table partitioning, and/or query caching. In one or more embodiments, index utilization includes ensuring that columns used in WHERE clauses for filtering conditions are indexed (e.g., using indexes on frequently searched/filtered columns). In one or more embodiments, avoid "SELECT" includes using specific column names in the SELECT clause instead of using SELECT*, in order to simplify and clarify the query (e.g., using SELECT column1, column2 FROM table). In one or more embodiments, join optimization includes optimizing join operations by choosing the best join type, such as INNER JOIN, LEFT JOIN, RIGHT JOIN, FULL JOIN (e.g., selecting INNER JOIN instead of LEFT JOIN when possible). In one or more embodiments, subquery optimization includes rewriting correlated subqueries, such as by using JOIN or EXIST clauses for identified correlated subqueries. In one or more embodiments, avoid cursors includes minimizing the usage of cursors, which may further be based on the size of the database (e.g., rewriting cursor-based logic using set-based operations). in one or more embodiments, WHERE clause includes optimizing WHERE clauses by using indexed columns and avoiding complex expressions. In one or more embodiments, avoid "ORDER BY" in subqueries includes minimizing the use of ORDER BY in subqueries which may include sorting an outer query. In one or more embodiments, avoid function in "WHERE" clause includes avoiding the use of functions on columns included in the WHERE clause to maintain index usage, which may include performing functions only on columns outside of the WHERE clause or using indexed columns when performing functions. In one or more embodiments, table partitioning includes determining whether a database is above a threshold size and partitioning the database/table based on certain criteria such as data ranges. In one or more embodiments, query caching includes caching query results based on certain criteria such as a certain query being executed above a threshold number of times.

In one or more embodiments, the ranking generator (208) is designed and configured to generate rankings for each query of a set of queries based on SQL queries that are generated by the natural language processor (204) and/or the SQL optimizer (206). To that extent, the ranking generator (208) may include functionality to: determine the quality of an optimized query by identifying key criteria like execution time, resource usage, and adherence to optimization best practices; give each criteria a weight according to its significance; gather appropriate metrics for every alternate query according to the specified standards; initiate, at least partially, the queries and assess their results based on the selected standards; normalize the data that has been gathered; assign weights to each alternate query and use the normalized metrics to obtain scores for each query; and rank the queries according to the obtained scores.

In one or more embodiments, the response generator (210) is designed and configured to receive the user inputs from the query device interface (202), generate responses to user inputs, and perform actions an action set. To provide this functionality, the response generator (210) may utilize machine learning and natural language processing techniques (e.g., in conjunction with the natural language processor (204)) to determine and provide the action. For example, the response generator (212) may utilize a transformer model trained on a large conversational dataset to provide a natural language response to the user that also captures the action and/or the set of potential queries and their associated rankings. The response generator (210) then provides the response to the query device interface (202) which can present the response to the user. In one or more embodiments, the action from the action set includes executing a query of the set of potential queries on the target database, reevaluating the set of rankings, generating a new potential set of queries, providing answers to user inputs, and manipulating the database based on the user input.

Turning to FIG. 3, FIG. 3 shows a flowchart describing a method for automatically generating ranked SQL queries based on user inputs in accordance with one or more embodiments disclosed herein. The method may be performed by, for example, the support agent (e.g., 200, FIG. 2).

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 300, the support agent receives a SQL input. As described above, the SQL input may be received directly from a user input or from a text-to-SQL generator that receives a natural language query from a user input and converts the natural language query to the SQL input. In one or more embodiments, the SQL generator is part of the support agent (e.g., via the natural language processor (204) in FIG. 2) or is separate from the support agent. In one or more embodiments, the user input is received by a query device interface (e.g., the query device interface (202) in FIG. 2) from a user via a query device (e.g., the query device (100) in FIG. 1). The user input may include any type of user input that conveys a request to search a database, including text input, voice input, menu selection, and/or image input.

In Step 302, the support agent identifies a database based on the SQL input. In one or more embodiments, the database is selected directly by the user. In one or more embodiments, the database includes multiple databases. Further, in one or more embodiments the database is identified based on identifying a relevance score of each potential database and the user input.

In Step 304, the support agent (e.g., using the SQL optimizer (206) in FIG. 2) identifies an optimization ruleset based on the database. In one or more embodiments, the optimization ruleset is also based on a user input and/or the received SQL input. In one or more embodiments, the optimization ruleset is based on characteristics of the database being queried (e.g., metadata associated with the database which may include the size of the database, the type stored in the database, compliance rules associated with the database, row and column information, applications and/or users associated with the database, etc.), the types of queries being utilized (e.g., associated with the database and/or the user requesting the queries), and/or desired performance outcomes for the input query (e.g., resource efficiency, time efficiency, or a combination thereof). Further, the contents of the optimization ruleset can include any of the contents described above.

In Step 306, a set of potential queries is generated using the SQL input and the optimization ruleset as inputs to a natural language processor (e.g., the natural language processor (204) in FIG. 2). In one or more embodiments, the natural language processor applies the optimization ruleset to the SQL input to generate a potential query. In addition, in one or more embodiments, the natural language processor at least partially executes the potential query to identify additional information about the potential query (e.g., resource usage, time to completion, etc.). In one or more embodiments, the natural language processor uses past performance of executed queries to estimate additional information about the potential query. The natural language processor may iterate this process any number of times to generate a set of potential queries.

In one or more embodiments, the natural language processor generates each potential query by: tokenizing the SQL input and/or the optimization ruleset into separate tokens, which may include literals, keywords, identifiers and/or punctuation; determining the grammatical parts of speech for each token and tag the token with the associated part of speech (e.g., verb, noun, preposition, conjunction, symbol, adjective, adverb, etc.); utilizing dependency parsing to examine the query's syntactic structure to determine the relationships between the tokens (e.g., nominal subject, object of a preposition, attribute, etc.); using named entity recognition to locate entities in the query, such as table and column names and other header information; and considering both user intent and metadata associated with the database to dynamically select relevant portions of the database.

For example, the natural language processor may perform the above steps in the following, non-limiting example, identifying that a SELECT* function is present and identifying the intent as being the portion of the query contained within the SELECT* function. Then, if the intent matches a predefined intent, relevant columns are identified based on metadata related to the database and the intent. Then, the portion of the query containing SELECT* can be replaced with the specific columns instead, thereby improving the functionality of the query.

In Step 308, a ranking is generated for each query of the set of potential queries. In one or more embodiments, generating each ranking includes: determining a criteria or set of criteria associated with a goal of the query, such as execution time, resource usage and adherence to the optimization ruleset; determining a weight for each criteria (e.g., more than one criteria may be considered, but the importance of each criteria may vary); determining a score for each of the queries based on the criteria (e.g., each query may have a number of associated scores, with each score being related to a different criteria); normalizing the score for each of the queries (e.g., testing of each criteria may use different units, ranges, or metrics); assigning the weights to each score for each query and then combining the scores associated with each query into a final score for each query; and ranking the queries based on their final scores.

In Step 310, the support agent causes a visualization of the set of potential queries along with each associated ranking to be displayed on a user interface. In one or more embodiments, the visualization is provided to a user (e.g., a user of the query device, an administrator terminal, etc.). In response, the query device obtains the visualization and displays the one or more visualizations on the GUI on a display. In one or more embodiments, the visualization includes the list of potential queries to be displayed in a ranked, descending order and also provides the scoring associated with each of the potential queries.

In Step 312, the support agent receives a user input and performs an action from an action set based on the received user input. In one or more embodiments, the user input includes a selection of one of the queries, changing the criteria and/or the weights associated with one or more of the criteria, a new query request, etc. In one or more embodiments, the action set includes executing the selected query on the target database and presenting a results list to the user, reevaluating the set of rankings and presenting the new set of potential queries to the user, generating a new set of potential queries and presenting the new set of potential queries to the user, and/or iterating any combination of the preceding steps of FIG. 3.

In one or more embodiments, the method ends following Step 312.

As discussed above, embodiments of the disclosure may be implemented using computing devices. FIG. 4 shows a diagram of a computing device (400) in accordance with one or more embodiments. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment, the computer processor(s) (402) may be an integrated circuit for processing instructions. For example, the computer processor(s) (402) may be one or more cores or micro-cores of a processor. The computing device (400) may also include one or more input devices (410), such as a touchscreen, keyboard, mouse, microphone, touchpad, electronic pen, or any other type of input device. The communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) (408, 410) may be locally or remotely connected to the computer processor(s) (402), non-persistent storage (404), and persistent storage (406). Many diverse types of computing devices exist, and the aforementioned input and output device(s) (408, 410) may take other forms.

The problems discussed above should be understood as being examples of problems solved by embodiments of the disclosure and the disclosure should not be limited to solving the same/similar problems. The disclosed disclosure is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for generating ranked queries, the method comprising:

receiving a structured query language (SQL) input;

identifying a target database based on the SQL input;

identifying an optimization ruleset based on the target database;

generating a set of potential queries by using the SQL input and the optimization ruleset as an input to a natural language processor, wherein the natural language processor performs a partial execution of each potential query of the set of potential queries to generate the set of potential queries;

generating a set of rankings, wherein each ranking is associated with one of the set of potential queries, wherein generating the set of rankings is based on a set of criteria comprising execution time, resource usage, and adherence to the optimization ruleset, and generating the set of rankings comprises:

determining a weight for each of the set of criteria;

determining a score for each of the set of criteria for each of the query of the set of potential queries to obtain a score set;

applying the weight for each of the set of criteria to each associated score; and normalizing the score set;

causing to display, on a graphical user interface of a query device interface, each query of the set of potential queries based on the set of rankings;

receiving a user input from the query device interface; and performing an action from an action set based on the user input.

2. The method of claim 1, wherein the SQL input is received from a natural language to SQL generator.

3. The method of claim 1, wherein the optimization ruleset is generated based on a combination of user inputs and metadata associated with the target database.

4. The method of claim 3, wherein the optimization ruleset comprises index utilization, avoid "SELECT", join optimization, subquery optimization, aggregate functions, avoid cursors, where clause, avoid "ORDER BY" in subqueries, avoid function in "WHERE" clause, or table partitioning.

5. The method of claim 1, wherein the action set comprises executing a query of the set of potential queries on the target database, reevaluating the set of rankings, and generating a new potential set of queries.

6. A non-transitory computer readable medium (CRM) comprising computer readable program code, which when executed by a computer processor, enables the computer to perform a method for generating ranked queries, the method comprising:

receiving a structured query language (SQL) input;

identifying a target database based on the SQL input;

identifying an optimization ruleset based on the target database;

generating a set of potential queries by using the SQL input and the optimization ruleset as an input to a natural language processor, wherein the natural language processor performs a partial execution of each potential query of the set of potential queries to generate the set of potential queries;

generating a set of rankings, wherein each ranking is associated with one of the set of potential queries, wherein generating the set of rankings is based on a set of criteria comprising execution time, resource usage, and adherence to the optimization ruleset, and generating the set of rankings comprises:

determining a weight for each of the set of criteria;

determining a score for each of the set of criteria for each of the query of the set of potential queries to obtain a score set;

applying the weight for each of the set of criteria to each associated score; and normalizing the score set;

causing to display, on a graphical user interface of a query device interface, each query of the set of potential queries based on the set of rankings;

receiving a user input from the query device interface; and performing an action from an action set based on the user input.

7. The non-transitory CRM of claim 6, wherein the SQL input is received from a natural language to SQL generator.

8. The non-transitory CRM of claim 6, wherein the optimization ruleset is generated based on a combination of user inputs and metadata associated with the target database.

9. The non-transitory CRM of claim 8, wherein the optimization ruleset comprises index utilization, avoid "SELECT", join optimization, subquery optimization, aggregate functions, avoid cursors, where clause, avoid "ORDER BY" in subqueries, avoid function in "WHERE" clause, or table partitioning.

10. The non-transitory CRM of claim 6, wherein the action set comprises executing a query of the set of potential queries on the target database, reevaluating the set of rankings, and generating a new potential set of queries.

11. A method for generating ranked queries, the method comprising:

receiving a structured query language (SQL) input;

identifying a target database based on the SQL input;

identifying an optimization ruleset based on the target database;

generating a set of potential queries by using the SQL input and the optimization ruleset as an input to a natural language processor, wherein the natural language processor performs a partial execution of each potential query of the set of potential queries to generate the set of potential queries;

generating, based on a set of criteria, a set of rankings, wherein each ranking is associated with one of the set of potential queries, wherein generating the set of rankings comprises:

determining a weight for each of the set of criteria, wherein the set of criteria comprises execution time, resource usage, and adherence to the optimization ruleset;

determining a score for each query of the set of potential queries to obtain a score set; and normalizing the score set;

causing to display, on a graphical user interface of a query device interface, each query of the set of potential queries based on the set of rankings;

receiving a user input from the query device interface; and performing an action from an action set based on the user input.

12. The method of claim 11, wherein the SQL input is received from a natural language to SQL generator.

13. The method of claim 11, wherein the optimization ruleset is generated based on a combination of user inputs and metadata associated with the target database.

14. The method of claim 13, wherein the optimization ruleset comprises index utilization, avoid "SELECT", join optimization, subquery optimization, aggregate functions, avoid cursors, where clause, avoid "ORDER BY" in subqueries, avoid function in "WHERE" clause, or table partitioning.

* * * * *